US011353862B2

(12) United States Patent
Yu et al.

(10) Patent No.: US 11,353,862 B2
(45) Date of Patent: Jun. 7, 2022

(54) METHOD, APPARATUS AND SYSTEM FOR DETERMINING SIGNAL RULES OF DATA FOR DATA ANNOTATION

(71) Applicant: Siemens Aktiengesellschaft, Munich (DE)

(72) Inventors: Ming Yu, Wuhan (CN); Yong Yuan, Beijing (CN); Qi Wang, Wuhan (CN)

(73) Assignee: SIEMENS AKTIENGESELLSCHAFT, Munich (DE)

(*) Notice: Subject to any disclaimer, the term of this patent is extended or adjusted under 35 U.S.C. 154(b) by 940 days.

(21) Appl. No.: 15/992,288

(22) Filed: May 30, 2018

(65) Prior Publication Data
US 2018/0348746 A1    Dec. 6, 2018

(30) Foreign Application Priority Data

May 31, 2017  (CN) .......................... 201710400334.1

(51) Int. Cl.
G06F 17/30       (2006.01)
G05B 23/02       (2006.01)
(Continued)

(52) U.S. Cl.
CPC ......... G05B 23/0245 (2013.01); G05B 15/02 (2013.01); G05B 17/02 (2013.01);
(Continued)

(58) Field of Classification Search
CPC .... G06F 16/24564; G06F 16/81; G06F 16/13; G06F 16/21; G06F 16/24; G06F 16/156;
(Continued)

(56) References Cited

U.S. PATENT DOCUMENTS 6,017,143 A      1/2000  Eryurek et al.
9,207,670 B2 *  12/2015  Rud .................. G05B 23/0221
(Continued)

FOREIGN PATENT DOCUMENTS

CN   102523103 A   6/2012
CN   103095609 A   5/2013
(Continued)

OTHER PUBLICATIONS

Extended European Search Report dated Mar. 21, 2019.
(Continued)

Primary Examiner — Hung D Le
(74) Attorney, Agent, or Firm — Harness, Dickey & Pierce, P.L.C.

(57) ABSTRACT

A method, apparatus, and system are for determining signal rules and annotating data. The method, according to an embodiment, includes: determining data obtaining logic based on assembly model information corresponding to the assembly; wherein the data obtaining logic includes a to-be-obtained data object and an obtaining rule; determining at least one physical signal corresponding to the data obtaining logic; and determining, based on the data obtaining logic and the at least one physical signal corresponding to the data obtaining logic, a signal rule corresponding to the obtaining rule. By annotating the running data of an assembly, the context of the data may be indicated, so that the running data of the assembly can be made more consistent, easier to maintain, and/or applied to a new environment. Moreover, since the annotation information of data can adopt a common format, it may be more suitable for information migration and system configuration.

7 Claims, 4 Drawing Sheets

(51) Int. Cl.
*G05B 15/02* (2006.01)
*G05B 17/02* (2006.01)
*G05B 19/418* (2006.01)
*G06F 16/36* (2019.01)
*G06F 17/40* (2006.01)

(52) U.S. Cl.
CPC ....... *G05B 19/418* (2013.01); *G05B 23/0208* (2013.01); *G06F 16/36* (2019.01); *G06F 16/367* (2019.01); *G06F 17/40* (2013.01)

(58) Field of Classification Search
CPC ...... G05B 23/0245; G05B 13/00; G06N 3/00; G06N 5/00
See application file for complete search history.

(56) References Cited

U.S. PATENT DOCUMENTS

| | | | |
|---|---|---|---|
| 9,377,330 B2* | 6/2016 | Pichot | H04B 17/17 |
| 9,473,514 B1 | 10/2016 | Chou et al. | |
| 9,602,122 B2* | 3/2017 | Rud | G05B 23/0221 |
| 2010/0070463 A1* | 3/2010 | Zhao | G06Q 10/06 707/E17.014 |
| 2013/0174633 A1* | 7/2013 | Pichot | H04B 17/17 73/1.01 |
| 2015/0189005 A1* | 7/2015 | Dubois | H04L 67/2823 709/217 |
| 2015/0312125 A1 | 10/2015 | Subramanian et al. | |
| 2015/0379049 A1 | 12/2015 | Gao et al. | |
| 2018/0292797 A1 | 10/2018 | Lamparter et al. | |

FOREIGN PATENT DOCUMENTS

| | | |
|---|---|---|
| CN | 105446983 A | 3/2016 |
| WO | WO-2014043667 A1 | 3/2014 |
| WO | WO 2015164359 A1 | 10/2015 |
| WO | WO 2016080964 A1 | 5/2016 |

OTHER PUBLICATIONS

Partial European Search Report dated Nov. 23, 2018.
First Office Action dated Jun. 24, 2021 in Chinese Application No. 201710400334.1.

* cited by examiner

METHOD, APPARATUS AND SYSTEM FOR DETERMINING SIGNAL RULES OF DATA FOR DATA ANNOTATION

PRIORITY STATEMENT

The present application hereby claims priority under 35 U.S.C. § 119 to Chinese patent application number CN 201710400334.1 filed May 31, 2017, the entire contents of which are hereby incorporated herein by reference.

FIELD

At least one embodiment of the present invention generally relates to the field of industrial Internet of Things (IoT), and in particular, to a method, an apparatus, and/or a system for annotating data by obtaining signal rules of data.

BACKGROUND ART

Currently, cloud computing is widely used in data analysis of digital plant applications. In a digital plant, production process data is collected by various sensors installed on field apparatuses. For example, a vibration sensor is mounted on the shaft of the machine tool to collect vibration conditions, indicating whether the running shaft is in a good condition.

This data is transmitted to the service center at the cloud center via a variety of networks. Usually, these networks are often in different states and have different transmission capabilities. Therefore, when the transmission rate of the network is low, it may affect the transmission service of the upper application, for example, causing delay. Moreover, it will have other effects on production.

SUMMARY

There are several methods of solving this problem. A first method is to download an analysis algorithm locally; therefore, when the data collection is complete, the data can be analyzed locally.

However, the inventors have recognized that the problem with this method is that, since algorithms are often limited to specific data types, they may not be able to perform complex analysis based on the entire system.

A second method is to use historical data for analysis, which means that in the event of an emergency, online services cannot be provided. A third method is to analyze an on-site automated system by an expert or system operator who has mastered knowledge of the target system, but the inventors have recognized that this method is too dependent on manual operation.

In view of this, one of the problems solved by an embodiment of the present invention is to obtain annotation information on data so that the data itself has a context, thereby avoiding a situation where sufficient data fails to be obtained due to a network problem.

According to at least one embodiment of the present invention, a method for determining event information corresponding to an assembly is provided, wherein the method comprises:
  determining data obtaining logic based on assembly model information corresponding to the assembly, wherein the data obtaining logic comprises a to-be-obtained data object and an obtaining rule;
  determining at least one physical signal corresponding to the data obtaining logic; and
  determining, based on the data obtaining logic and the at least one physical signal corresponding to the data obtaining logic, a signal rule corresponding to the obtaining rule.

According to at least one embodiment of the present invention, there is also provided a method for annotating collected data of an assembly, wherein the method comprises:
  receiving running data information corresponding to the assembly; and
  adding corresponding annotation information to the running data information based on a signal rule corresponding to the assembly and a semantic ontology module corresponding to the assembly.

According to at least one embodiment of the present invention, a rule determining apparatus for determining event information corresponding to an assembly is further provided, wherein the rule determining apparatus comprises:
  a logic determining apparatus, configured to determine data obtaining logic based on assembly model information corresponding to the assembly, wherein the data obtaining logic comprises a to-be-obtained data object and an obtaining rule;
  a first determining apparatus, configured to determine at least one physical signal corresponding to the data obtaining logic; and
  a second determining apparatus, configured to determine, based on the data obtaining logic and the at least one physical signal corresponding to the data obtaining logic, a signal rule corresponding to the obtaining rule.

According to at least one embodiment of the present invention, a data annotation apparatus for annotating data of a collected assembly is also provided, wherein the data annotating apparatus is configured to:
  receive running data information corresponding to the assembly; and
  add corresponding annotation information to the running data information based on a signal rule corresponding to the assembly and a semantic ontology module corresponding to the assembly.

According to at least one embodiment of the present invention, a system for determining event information for annotating data is also provided, comprising: the rule determining apparatus of at least one embodiment; and the data annotating apparatus of at least one embodiment.

BRIEF DESCRIPTION OF THE DRAWINGS

Other characteristics, features, advantages, and benefits of the present invention will become more apparent from the following detailed description taken in conjunction with the drawings.

DETAILED DESCRIPTION OF THE EXAMPLE EMBODIMENTS

Figure 1:
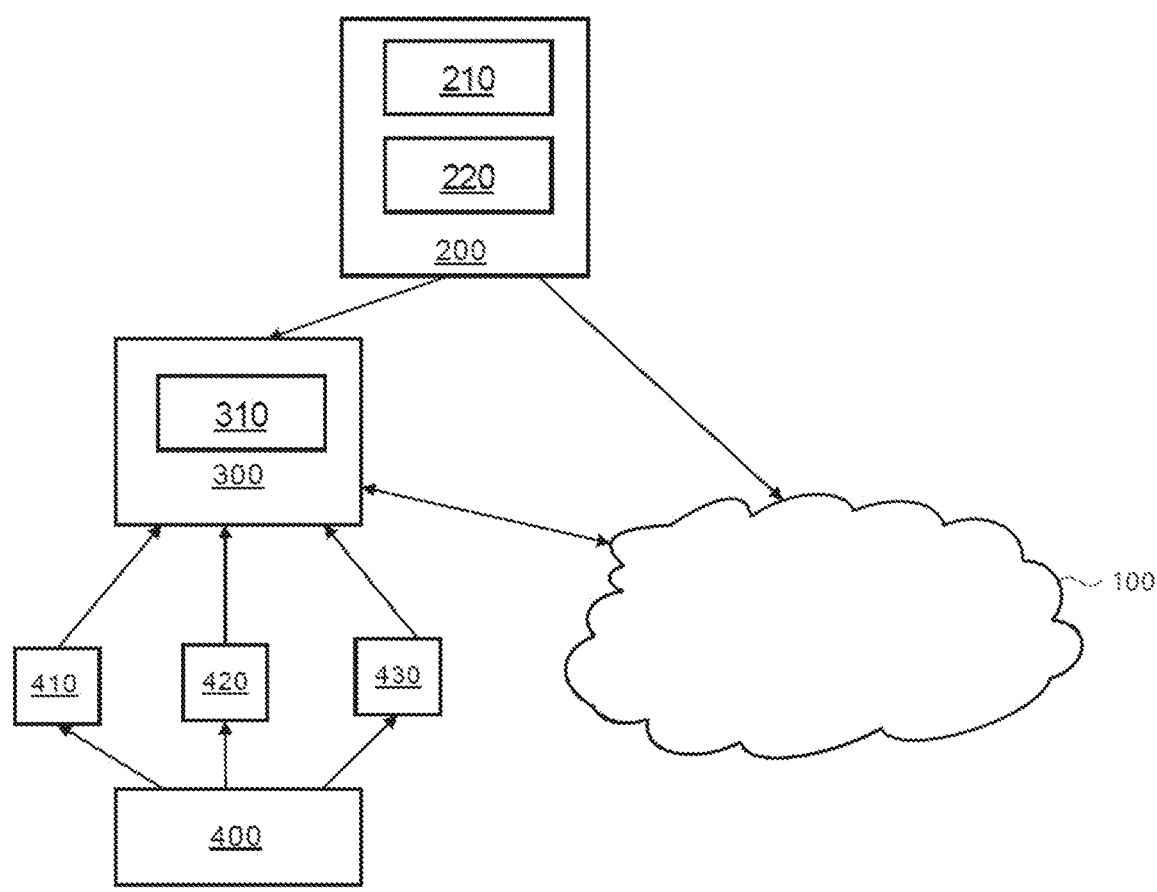
FIG. 1 is a system framework diagram for determining and annotating data obtaining rules of a semantic-based IoT apparatus according to an embodiment of the present invention.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to at least one embodiment of the present invention, a method for determining event information corresponding to an assembly is provided, wherein the method comprises:
  determining data obtaining logic based on assembly model information corresponding to the assembly, wherein the data obtaining logic comprises a to-be-obtained data object and an obtaining rule;
  determining at least one physical signal corresponding to the data obtaining logic; and
  determining, based on the data obtaining logic and the at least one physical signal corresponding to the data obtaining logic, a signal rule corresponding to the obtaining rule.

According to at least one embodiment of the present invention, there is also provided a method for annotating collected data of an assembly, wherein the method comprises:
  receiving running data information corresponding to the assembly; and
  adding corresponding annotation information to the running data information based on a signal rule corresponding to the assembly and a semantic ontology module corresponding to the assembly.

According to at least one embodiment of the present invention, a rule determining apparatus for determining event information corresponding to an assembly is further provided, wherein the rule determining apparatus comprises:
  a logic determining apparatus, configured to determine data obtaining logic based on assembly model information corresponding to the assembly, wherein the data obtaining logic comprises a to-be-obtained data object and an obtaining rule;
  a first determining apparatus, configured to determine at least one physical signal corresponding to the data obtaining logic; and
  a second determining apparatus, configured to determine, based on the data obtaining logic and the at least one physical signal corresponding to the data obtaining logic, a signal rule corresponding to the obtaining rule.

According to at least one embodiment of the present invention, a data annotation apparatus for annotating data of a collected assembly is also provided, wherein the data annotating apparatus is configured to:
  receive running data information corresponding to the assembly; and
  add corresponding annotation information to the running data information based on a signal rule corresponding to the assembly and a semantic ontology module corresponding to the assembly.

According to at least one embodiment of the present invention, a system for determining event information for annotating data is also provided, comprising: the rule determining apparatus of at least one embodiment; and the data annotating apparatus of at least one embodiment.

Compared with the prior art, at least one embodiment of the present invention has at least one of the following advantages: By annotating the running data of an assembly, the context of the data is indicated, so that the running data of the assembly can be made more consistent, easier to maintain, and applied to a new environment. Moreover, since the annotation information of data can adopt a common format, it is more suitable for information migration and system configuration.

Preferred embodiments of the present disclosure will be described below in more detail with reference to the accompanying drawings. Although the drawings show preferred embodiments of the present disclosure, it should be understood that the present disclosure may be implemented in various forms and should not be limited by the embodiments described herein. Rather, these embodiments are provided to make this disclosure thorough and complete, and fully convey the scope of this disclosure to those of ordinary skill in the art.

FIG. 1 is a system framework diagram for determining and annotating data obtaining rules of a semantic-based IoT apparatus according to an embodiment of the present invention. As shown in FIG. 1, an industrial cloud 100 and multiple gateways and apparatuses coupled to the industrial cloud are provided in the IoT.

In this embodiment, only one gateway 300 is shown. The gateway 300 comprises a data annotating apparatus 310 and a motor 400 corresponding to the gateway. The motor 400 is connected to three sensors, which are a start sensor 410, a rotation speed sensor 420, and an end sensor 430, respectively. The semantic description layer 200 on the apparatus side of the IoT is used to semantically describe the apparatus.

The semantic description layer 200 comprises a semantic ontology module 210 and a rule determining apparatus 220. The rule determining apparatus 220 is configured to associate each signal in the semantic ontology module 210 with an actual physical signal, and further to convert a rule for obtaining data from the semantic ontology module into a data obtaining rule based on physical signals. The data obtaining rule based on physical signals is provided to the gateway 300 so that the gateway 300 can annotate the obtained data based on the data obtaining rule and the corresponding semantic ontology module 210, thereby annotating the data of the gateway 300. Thus, data uploaded by the data annotating apparatus 310 of the gateway to the industrial cloud 100 comprises information such as at least one physical signal (including multiple physical signals) generated during collection. In other words, the obtained data also contains the running environment information corresponding to the data.

As a result, the industrial cloud 100 can combine the running environment information on the data when performing an analysis based on the data to obtain more reliable analysis results. In addition, this kind of data can be used for analysis under a variety of circumstances. For example, when the analysis is performed locally, since this type of data carries its own running environment information, a more accurate analysis result can still be obtained. For another example, when the network status of the data source is not good and part of the data is lost, a data obtaining rule can still be combined to obtain a more satisfactory analysis result.

Preferably, the rule determining apparatus 220 may also perform analysis in conjunction with system documents and/or on-site control information to determine corresponding data obtaining rules.

System description documents include but are not limited to: project program information documents; module I/O information, as well as system symbol tables and other auxiliary and explanatory documents.

On-site control information comprises, but is not limited to, the input and output signals provided in the control program and its corresponding description documents, and the internal associations between each functional module and its sub-function modules that can be obtained in the control program and its explanatory documents.

Specifically, the rule determining apparatus 220 performs step S101, and determines data obtaining logic based on a semantic ontology module corresponding to the assembly.

The data obtaining logic comprises a to-be-obtained data object and an obtaining rule.

Specifically, the rule determining apparatus 220 parses the semantic ontology module corresponding to the assembly to determine the data obtaining logic.

Preferably, the rule determining apparatus 220 parses the semantic ontology module with the system description document and the on-site control information to determine the data obtaining logic.

Then, in step S102, the rule determining apparatus 220 determines the respective physical signals corresponding to the data obtaining logic.

Specifically, the rule determining apparatus, based on at least one piece of signal information corresponding to the to-be-acquired data and the corresponding obtaining rule, traces respective source signals of the at least one piece of signal information in the source code, until physical signals corresponding to each piece of signal information in the at least one piece of signal information are determined.

Preferably, the rule determining apparatus 220 finds the source module of the signal information corresponding to the data obtaining logic, wherein the source module may be various functional modules that complete various functions of the semantic ontology module. Then, the rule determining apparatus 220 determines one or more pieces of lower layer signal information corresponding to the signal information in the source module. Then, the rule determining apparatus 220 repeatedly performs the above-mentioned two steps based on the acquired signal information of the respective lower layers until the signal information of the lowermost layer having a physical address is obtained. In addition, the rule determining apparatus 220 determines the corresponding physical signal based on the physical address corresponding to the signal information of the lowermost layer.

Figure 2:
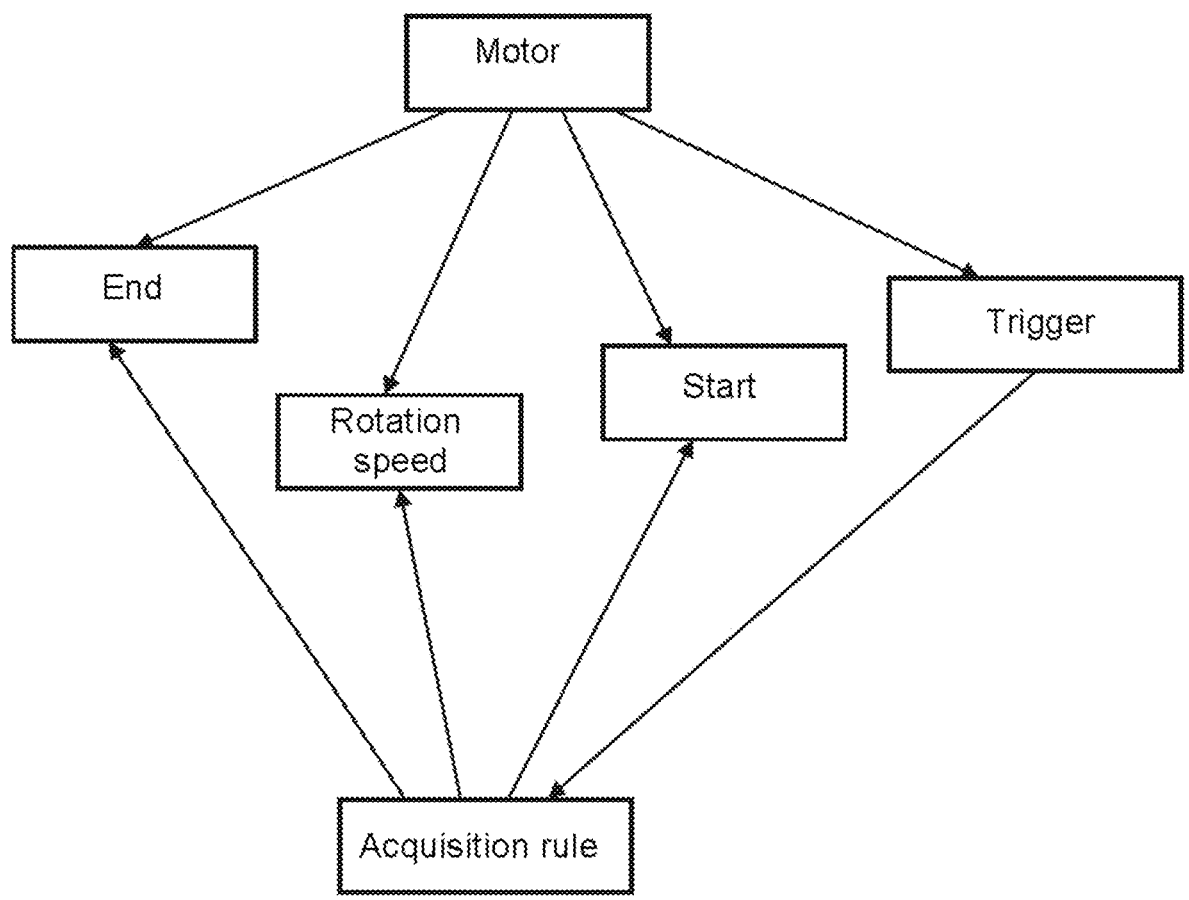
FIG. 2 is a schematic diagram of a semantic ontology module of a motor assembly according to an embodiment of the present invention.
Figure 3:
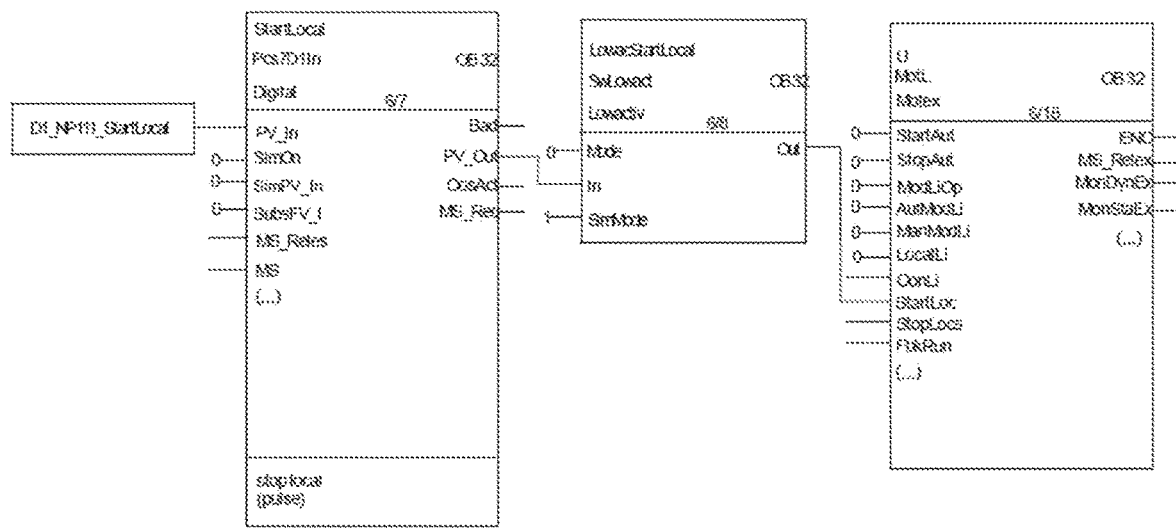
FIG. 3 schematically illustrates the traceback of the signal transmission of the semantic ontology module of the motor corresponding to FIG. 2.

According to an embodiment of the present invention, the assembly is a motor m1. See FIGS. 2 and 3. FIG. 2 shows the semantic ontology module of the motor m1, and FIG. 3 shows a signal traceback diagram for the semantic ontology module of the motor corresponding to FIG. 2.

The semantic ontology module m1 of the motor comprises four modules: stop module, rotation speed module, start module, and trigger module.

The semantic ontology module of the motor m1 corresponds to signal MotL, which is used to output signal information including the stop, start, and rotation speed of the motor m1. The stop module it contains corresponds to signal StopLoca, which is used to output a signal to MotL indicating that the motor has stopped running; the rotation speed module corresponds to the signal counter, which is used to output the rotation speed of the motor to MotL; the start module corresponds to signal StartLoc, and the output of this signal is used to indicate that the motor is starting to operate; and the trigger module comprises a data obtaining rule. According to an embodiment of the present invention, the obtaining rule comprises: the stop module output is invalid, the start module output is valid, and the rotation speed module output is >200 rpm.

See FIG. 3 again. The first block from the right part of FIG. 3 corresponds to the input and output of signal MotL, and traces the input signal of StartLoc in the MotL to find that the signal is sourced from the output "out" from the module LowacStartLocal (see the second block from the right part of FIG. 4), and determines that the corresponding input signal of the output is "In". Then, the rule determining apparatus 100 finds that the signal is sourced from the control module of the signal (see the second block from the left part of FIG. 4), determines that the input signal "In" is sourced from the input signal "PV_In" of the control module, then finds the source physical signal of the input signal: D1_NP111_StartLocal (see the first block from the left part of FIG. 4), and determines its physical address, i.e., the physical address of the storage location of the signal in the storage apparatus. The signal in this storage location is sourced from a pulse triggered by a switch button.

The rule determining apparatus 220 determines that the physical signal corresponding to the start signal is the content stored in the storage address D1_NP111_StartLocal.

Next, in step S103, the rule determining apparatus 220 determines a signal rule corresponding to the obtaining rule based on the data obtaining logic and the corresponding at least one physical signal or multiple physical signals.

Specifically, the rule determining apparatus 220 determines, based on the data obtaining logic and the at least one physical signal or multiple physical signals corresponding to the data obtaining logic, a signal rule corresponding to the obtaining rule of the assembly.

The signal rule can be expressed using a document in a uniform format. Preferably, it can be expressed in an xml document.

The above-mentioned embodiment is further described as follows. By a similar method, after the rule determining apparatus 220 determines the physical storage address D1_NP111_StartLocal of the physical signal corresponding to the start signal, it continues to determine the physical storage addresses of physical signals D1_NP111_StopLocal and D1_NP111_RoationSpeed respectively corresponding to the stop signal and the rotation speed signal corresponding to the data obtaining logic; then, an XML document corresponding to the signal rule is generated on the basis of the determined three physical signals and the corresponding obtaining rule as follows:

```
<event>
    <eventname>onload</eventname>
    <PreconditionOperator>AND<PreconditionOperator>
    <Precondition>
        <VariableName>D1_NP111_StartLocal<VariableName>
        <VariableValue>TRUE<VariableValue>
    </Precondition>
    <Precondition>
        <VariableName>D1_NP111_StopLocal<VariableName>
        <VariableValue>FALSE<VariableValue>
    </Precondition>
    <Precondition>
        <VariableName>D1_NP111_RoationSpeed<VariableName>
        <Description>LargerThen200<Description>
    </Precondition>
    <PreconditionOperator>
</event>
```

According to a preferred embodiment of the present invention, the method according to the present invention further comprises step S104, and step S201 and step S202 performed by the data annotating apparatus 310 on the gateway 300.

In step S104, the rule determining apparatus 100 transmits the signal rule so that the receiving end processes the data based on the signal rule.

Preferably, the rule determining apparatus 220 sends the signal rule to the data annotating apparatus 310, wherein the data annotating apparatus 310 is located at the gateway 300.

In step S201, the data annotating apparatus 310 receives the running data information corresponding to the assembly.

Specifically, the data annotating apparatus 310 receives the running data information corresponding to the assembly via at least one sensor installed on the assembly.

The running data information comprises assembly-related data that can be collected.

Next, in step S202, the data annotating apparatus 310 adds corresponding annotation information to the running data information based on the signal rule corresponding to the assembly and the semantic ontology module corresponding to the assembly.

The annotation information comprises, but is not limited to, at least any one of the following:

1) Environmental information during acquisition of the running data. For example, when the assembly is a motor, its environmental information may include current information and voltage information.

2) A signal rule corresponding to the running data.

Preferably, the data annotating apparatus 310 receives a signal rule from the rule determining apparatus 220.

The annotation information can be described in a general file format, for example, using an xml document.

More preferably, the data annotating apparatus 310 sends the running data information to which annotation information is added to the industrial cloud 100 so that the industrial cloud 100 performs an analysis based on the running data information.

According to the technical solution of at least one embodiment of the present invention, by determining various events of the assembly and then annotating the running data of the assembly, the context of the data is indicated so that the running data of the assembly can be more consistent, easier to maintain, and applied in a new environment. Moreover, since the annotation information of data can adopt a general format, it is more suitable for information migration and system configuration.

According to another embodiment of the present invention, the rule determining apparatus 220 comprises a logic obtaining apparatus (not shown), a first determining apparatus (not shown), and a second determining apparatus (not shown).

The logic obtaining apparatus determines the data obtaining logic based on the semantic ontology module corresponding to the assembly.

The data obtaining logic comprises a to-be-obtained data object and an obtaining rule.

Specifically, the logic obtaining apparatus parses the semantic ontology module corresponding to the assembly to determine the data obtaining logic.

Preferably, the logic obtaining apparatus parses the semantic ontology module to determine the data obtaining logic in combination with system description documents and on-site control information.

Then, the first determining apparatus determines respective physical signals corresponding to the data obtaining logic.

Specifically, the first determining apparatus, based on at least one piece of signal information corresponding to the to-be-acquired data and the corresponding obtaining rule, traces respective source signals of the at least one piece of signal information in the source code, until physical signals corresponding to each piece of signal information in the at least one piece of signal information are determined.

Preferably, the first determining apparatus searches for a source module of the signal information corresponding to the data obtaining logic, wherein the source module comprises various functional modules corresponding to various functions of the semantic ontology module. Then, the first determining apparatus determines one or more pieces of lower layer signal information corresponding to the signal information in the source module. Next, the first determining apparatus repeatedly performs the above-mentioned two steps based on the obtained signal information of the respective lower layers until the signal information of the lowermost layer having the physical address is obtained; in addition, the first determining apparatus determines the corresponding physical signal based on the physical address corresponding to the signal information of the lowermost layer.

According to an embodiment of the present invention, the assembly is a motor m1. See FIGS. 2 and 3. FIG. 2 shows the semantic ontology module of the motor m1, and FIG. 3 shows a traceback diagram of the signal transmission of the semantic ontology module of the motor corresponding to FIG. 2. Each block in FIG. 3 contains the input and output signals of the corresponding module (wherein the " . . . " part is omitted).

The semantic ontology module m1 of the motor comprises four modules: stop module, rotation speed module, start module, and trigger module.

The semantic ontology module of the motor m1 corresponds to signal MotL, which is used to output signal information, including the stop, start, and rotation speed of the motor m1. The stop module it contains corresponds to signal StopLoca, which is used to output a signal to MotL indicating that the motor has stopped running; the rotation speed module corresponds to the signal counter, which is used to output the rotation speed of the motor to MotL; the start module corresponds to signal StartLoc, and the output of this signal is used to indicate that the motor is starting to operate; the trigger module comprises a data obtaining rule. According to an embodiment of the present invention, the logic obtaining apparatus determines the to-be-acquired data as the stop signal, the start signal, and the rotation speed signal by parsing the semantic ontology module of m1; the obtaining rule includes: the stop module output is invalid, the start module output is valid, and the rotation speed module output is >200 rpm.

See FIG. 3 again. The first block from the right part of FIG. 3 corresponds to the input and output of signal MotL; the first determining apparatus traces the input signal of StartLoc in MotL to find that the signal is sourced from the output "out" of the module LowacStartLocal (see the second block from the right part of FIG. 4), and determines that the corresponding input signal of the output is "In". Then, the first determining apparatus finds that the signal is sourced from the control module of the signal (see the second block from the left part of FIG. 4), determines that the input signal "In" is sourced from the input signal "PV_In" of the control module, then finds the source physical signal of the input signal: D1_NP111_StartLocal (see the first block from the left part of FIG. 4), and determines its physical address, i.e., the physical address of the storage location of the signal in the storage apparatus. The signal in this storage location is sourced from a pulse triggered by a switch button.

The first determining apparatus determines that the physical signal corresponding to the start signal is the content stored in the storage address D1_NP111_StartLocal.

Then, the second determining apparatus determines the signal rule corresponding to the obtaining rule based on the data obtaining logic and the corresponding at least one physical signal or multiple physical signals.

Specifically, the second determining apparatus determines, based on the semantic ontology module, the data obtaining logic and the corresponding plurality of physical signals, a signal rule being represented by a physical signal corresponding to the obtaining rule of the assembly.

The signal rule can be expressed using a document in a uniform format. Preferably, it can be expressed in an xml document.

The above-mentioned embodiment is further described as follows. By a similar method, after the first determining apparatus determines the physical storage address D1_NP111_StartLocal of the physical signal corresponding to the start signal, it continues to determine the physical storage addresses of physical signals D1_NP111 StopLocal and D1_NP111 RoationSpeed respectively corresponding to the stop signal and the rotation speed signal corresponding to the data obtaining logic; then, a second determining apparatus generates an XML document corresponding to the signal rule on the basis of the determined three physical signals and the corresponding obtaining rule as follows:

```
<event>
    <eventname>onload</eventname>
    <PreconditionOperator>AND<PreconditionOperator>
    <Precondition>
        <VariableName>D1_NP111_StartLocal<VariableName>
        <VariableValue>TRUE<VariableValue>
    </Precondition>
    <Precondition>
        <VariableName>D1_NP111_StopLocal<VariableName>
        <VariableValue>FALSE<VariableValue>
    </Precondition>
    <Precondition>
        <VariableName>D1_NP111_RoationSpeed<VariableName>
        <Description>LargerThen200<Description>
    </Precondition>
    <PreconditionOperator>
</event>
```

According to a preferred embodiment of the present invention, the rule determining apparatus according to the present invention further comprises a first sending apparatus (not shown).

The first sending apparatus confirms that the rule determining apparatus 100 sends the signal rule so that the receiving end processes the data based on the signal rule.

Preferably, the first sending apparatus sends the signal rule to the data annotating apparatus 310, and the data annotating apparatus 310 is located at the gateway 300.

The data annotating apparatus 310 receives running data information corresponding to the assembly. Specifically, the data annotating apparatus 310 receives the running data information corresponding to the assembly via at least one sensor installed on the assembly.

The running data information comprises assembly-related data that can be collected.

Then, the data annotating apparatus 310 adds corresponding annotating information to the running data information based on the signal rule corresponding to the assembly and the semantic ontology module corresponding to the assembly.

The annotation information comprises, but is not limited to, at least any one of the following:

1) Environmental information during acquisition of the running data. For example, when the assembly is a motor, its environmental information may include current information and voltage information.

2) A signal rule corresponding to the running data.

Preferably, the data annotating apparatus 310 receives a signal rule from the rule determining apparatus 220.

The annotation information can be described in a general file format, for example, using an xml document.

More preferably, the data annotating apparatus 310 sends the running data information to which annotation information is added to the industrial cloud 100 so that the industrial cloud 100 performs an analysis based on the running data information.

According to the technical solution of at least one embodiment of the present invention, by determining various events of the assembly and then annotating the running data of the assembly, the context of the data is indicated so that the running data of the assembly can be more consistent, easier to maintain, and applied in a new environment. Moreover, since the annotation information of data can adopt a general format, it is more suitable for information migration and system configuration.

The apparatuses and devices shown in FIGS. 1 and 2 can be implemented by software, hardware (e.g., an integrated circuit, FPGA, etc.), or a combination of hardware and software.

Figure 4:
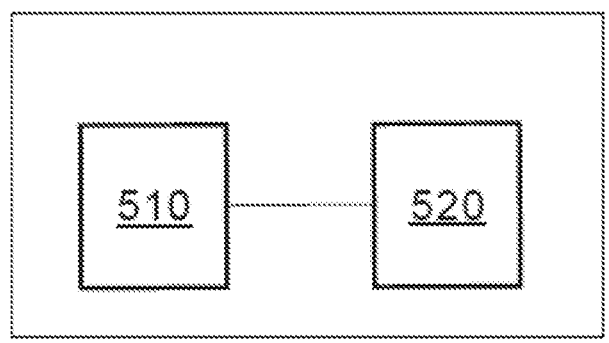
FIG. 4 is a general structural block diagram of a rule determining apparatus or a data annotating apparatus according to an embodiment of the present invention.

See FIG. 4, which shows a general structural diagram of a rule determining apparatus or data annotating apparatus according to an embodiment of the present invention. The rule determining apparatus or data annotating apparatus may comprise a memory 510 and a processor 520. The memory 310 may store executable instructions. The processor 520 can implement the operations performed by the units in FIG. 1 according to the executable instructions stored in the memory 510.

In addition, an embodiment of the present invention further provides a machine-readable medium, on which executable instructions are stored. When the executable instructions are executed, the machine is caused to perform operations implemented by the evaluation apparatus.

While the present invention has been particularly described above with reference to preferred embodiments, it should be understood that those of ordinary skill in the art can make various substitutions and improvements without departing from the spirit and scope of the present invention as defined by the claims.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for determining a signal rule of an assembly, comprising:
    determining data obtaining logic based on assembly model information corresponding to the assembly, wherein the data obtaining logic includes a to-be-obtained data object and an obtaining rule;
    determining at least one physical signal corresponding to the data obtaining logic, the determining the at least one physical signal including,
        searching for a source module corresponding to signal information in the data obtaining logic,
        determining one or more pieces of lower-layer signal information in the source module and corresponding to the signal information,
        repeating the searching and the determining of the one or more pieces based on relatively next-layer signal information, until relatively lowest-layer signal information including a physical address is obtained, and
        determining the at least one physical signal as a corresponding physical signal, based on the physical address corresponding to the relatively lowest-layer signal information; and
    determining, based on the data obtaining logic and the at least one physical signal corresponding to the data obtaining logic, a signal rule corresponding to the obtaining rule.

2. The method of claim 1, wherein the determining of the signal rule comprises:
    determining, based on a semantic ontology model, the data obtaining logic, and the at least one physical signal corresponding to the data obtaining logic, the signal rule corresponding to the obtaining rule of the assembly and represented by using the at least one physical signal.

3. The method of claim 1, further comprising:
    sending the signal rule, to enable a receive end to collect data based on the signal rule.

4. The method of claim 1, further comprising:
    providing the signal rule corresponding to the obtaining rule to a gateway.

5. A rule determining apparatus for determining a signal rule of an assembly, comprising:
    a logic determining apparatus, configured to determine data obtaining logic based on assembly model information corresponding to the assembly, the data obtaining logic including a to-be-obtained data object and an obtaining rule;
    a first determining apparatus, configured to,
        search for a source module corresponding to signal information in the data obtaining logic,
        determine one or more pieces of lower-layer signal information in the source module and corresponding to the signal information,
        repeat, based on the one or more pieces of lower-layer signal information obtained, the searching for the source module and the determining of the one or more pieces of lower-layer signal information, until a relatively lowest-layer signal information including a physical address is obtained, and
determine at least one physical signal corresponding to the data obtaining logic as a physical signal based on the physical address corresponding to the relatively lowest-layer signal information; and a second determining apparatus, configured to determine, based on the data obtaining logic and the at least one physical signal corresponding to the data obtaining logic, a signal rule corresponding to the obtaining rule.

6. The rule determining apparatus of claim 5, wherein the second determining apparatus is further configured to:
determine, based on a semantic ontology model, the data obtaining logic, and the at least one physical signal corresponding to the data obtaining logic, the signal rule corresponding to the obtaining rule of the assembly and represented by using the at least one physical signal.

7. The rule determining apparatus of claim 5, wherein the rule determining apparatus is further configured to:
send the signal rule, to enable a receive end to collect data based on the signal rule.

\* \* \* \* \*